(12) United States Patent
Hart et al.

(10) Patent No.: US 11,239,470 B2
(45) Date of Patent: Feb. 1, 2022

(54) INTEGRATED FUEL CELL AND COMBUSTION SYSTEM

(71) Applicant: General Electric Company, Schenectady, NY (US)

(72) Inventors: Richard Louis Hart, Broadalbin, NY (US); Jared Iverson, Niskayuna, NY (US); Andrew Wickersham, Niskayuna, NY (US); Patrick Daniel Willson, Clifton Park, NY (US); Daniel Jason Erno, Niskayuna, NY (US)

(73) Assignee: GENERAL ELECTRIC COMPANY, Schenectady, NY (US)

(*) Notice: Subject to any disclaimer, the term of this patent is extended or adjusted under 35 U.S.C. 154(b) by 357 days.

(21) Appl. No.: 16/222,712

(22) Filed: Dec. 17, 2018

(65) Prior Publication Data
US 2020/0194799 A1 Jun. 18, 2020

(51) Int. Cl.
*H01M 4/86* (2006.01)
*H01M 4/88* (2006.01)
*H01M 8/04014* (2016.01)
*H01M 8/124* (2016.01)

(52) U.S. Cl.
CPC ....... *H01M 4/8605* (2013.01); *H01M 4/8889* (2013.01); *H01M 8/04022* (2013.01); *H01M 8/124* (2013.01); *H01M 2008/1293* (2013.01)

(58) Field of Classification Search
None
See application file for complete search history.

(56) References Cited

U.S. PATENT DOCUMENTS

| 7,659,021 | B2 | 2/2010 | Horiuchi et al. |
| 8,288,060 | B2 | 10/2012 | Bae et al. |
| 8,309,270 | B2 | 11/2012 | Finnerty et al. |
| 9,666,888 | B2 | 5/2017 | Nagai et al. |
| 10,008,726 | B2 | 6/2018 | Leah et al. |
| 2002/0170504 | A1 * | 11/2002 | Kasahara ............. C01B 3/323 122/40 |
| 2004/0247982 | A1 * | 12/2004 | Sabin ............. H01M 8/241 429/514 |
| 2008/0193825 | A1 * | 8/2008 | Nguyen ............. H01M 8/0265 429/458 |
| 2013/0280634 | A1 | 10/2013 | Park et al. |
| 2016/0260991 | A1 | 9/2016 | Shapiro et al. |

FOREIGN PATENT DOCUMENTS

| JP | 11-214026 | * | 8/1999 |
| JP | 2004-192932 | * | 7/2004 |

OTHER PUBLICATIONS

Machine translation of JP 2004-192932, published on Jul. 8, 2004 (Year: 2004).*
Machine translation of JP11-214026, published on Aug. 6, 1999 (Year: 1999).*
Thorud, "Dynamic Modelling and Characterisation of a Solid Oxide Fuel Cell Integrated in a Gas Turbine Cycle", Trondheim, Oct. 2005, NTNU, (278 pages).
Krishnan "Recent developments in metal-supported solid oxide fuel cells" Mar. 30, 2017, Wires Energy and Environment, vol. 6 Issue: 5, 34 pages.

* cited by examiner

*Primary Examiner* — Anca Eoff
(74) *Attorney, Agent, or Firm* — Venable LLP; Edward A. Kmett; Michele V. Frank

(57) ABSTRACT

A topping cycle fuel cell unit includes a support plate having internal flow passages that extend to combustion outlets, a first electrode layer, an electrolyte layer, and a second electrode layer. The second electrode layer is configured to be coupled to another support plate of another fuel cell unit. The internal flow passages are configured to receive and direct air across the first electrolyte layer or the second electrolyte layer and to receive and direct fuel across another of the first electrolyte layer or the second electrolyte layer such that the first electrode layer, the electrolyte layer, and the second electrode layer create electric current. The internal flow passages are configured to direct at least some of the air and at least some of the fuel to the combustion outlets where the at least some air and the at least some fuel is combusted.

10 Claims, 9 Drawing Sheets

INTEGRATED FUEL CELL AND COMBUSTION SYSTEM

FIELD

The subject matter described herein generally relates to fuel cells and combustion systems.

BACKGROUND

Fuel cells are electrochemical energy conversion devices that have demonstrated a potential for relatively high efficiency and low pollution in power generation. A fuel cell generally provides a direct current (dc) which may be converted to alternating current (ac) via, for example, an inverter. The dc or ac voltage can be used to power motors, lights, communication equipment and any number of electrical devices and systems. Fuel cells may operate in stationary, semi-stationary, or portable applications. Certain fuel cells, such as SOFCs, may operate in large-scale power systems that provide electricity to satisfy industrial and municipal needs. Others may be useful for smaller portable applications such as, for example, powering cars.

A fuel cell produces electricity by electrochemically combining a fuel and an oxidant across an ionic conducting layer. This ionic conducting layer, also labeled the electrolyte of the fuel cell, may be a liquid or solid. Common types of fuel cells include phosphoric acid (PAFC), molten carbonate (MCFC), proton exchange membrane (PEMFC), and solid oxide (SOFC), all generally named after their electrolytes. In practice, fuel cells are typically amassed in electrical series in an assembly of fuel cells to produce power at useful voltages or currents.

In general, components of a fuel cell include the electrolyte and two electrodes. The reactions that produce electricity generally take place at the electrodes where a catalyst is typically disposed to speed the reactions. The electrodes may be constructed as channels, porous layers, and the like, to increase the surface area for the chemical reactions to occur. The electrolyte carries electrically charged particles from one electrode to the other and is otherwise substantially impermeable to both fuel and oxidant.

Typically, the fuel cell converts hydrogen (fuel) and oxygen (oxidant) into water (byproduct) to produce electricity. The byproduct water may exit the fuel cell as steam in high-temperature operations. This discharged steam (and other hot exhaust components) may be utilized in turbines and other applications to generate additional electricity or power, providing increased efficiency of power generation. If air is employed as the oxidant, the nitrogen in the air is substantially inert and typically passes through the fuel cell. Hydrogen fuel may be provided via local reforming (e.g., on-site steam reforming) or remote reforming of carbon-based feedstocks, such as reforming of the more readily available natural gas and other hydrocarbon fuels and feedstocks. Examples of hydrocarbon fuels include, but are not limited to, natural gas, methane, ethane, propane, methanol, and other hydrocarbons. The fuel that passes through the fuel cell may be reformed, but reforming this fuel can require additional cost and complexity to avoid allowing the fuel to go to waste.

BRIEF DESCRIPTION

In one embodiment, a topping cycle fuel cell unit is provided. The fuel cell unit includes a support plate having internal flow passages that extend to combustion outlets, a first electrode layer coupled with the support plate, an electrolyte layer coupled with the first electrolyte layer such that the first electrode layer is between the support plate and the electrolyte layer, and a second electrode layer coupled with the electrolyte layer such that the electrolyte layer is between the first electrode layer and the second electrode layer. The second electrode layer is configured to be coupled to another support plate of another fuel cell unit. The internal flow passages are configured to receive and direct air across the first electrode layer or the second electrode layer and to receive and direct fuel across another of the first electrode layer or the second electrode layer such that the first electrode layer, the electrolyte layer, and the second electrode layer create electric current. The internal flow passages are configured to direct at least some of the air and at least some of the fuel to the combustion outlets where the at least some air and the at least some fuel is combusted.

In one embodiment, an integrated fuel cell and combustion system is provided. The system includes plural fuel cells each having conductive support structures that include first and second plates defining one or more fuel passages and one or more air passages. Each of the one or more fuel passages is fluidly coupled with a fuel inlet and each of the one or more air passages fluidly coupled with an air inlet. The system also includes one or more catalyst layer stacks disposed between the first plate of the support structure and the one or more fuel passages and disposed between the second plate of the support structure and the one or more air passages. The one or more fuel passages are positioned to direct a flow of fuel on each of the one or more catalyst layer stacks. The one or more air passages are positioned to direct a flow of air on an opposite side of each of the one or more catalyst layer stacks to generate electric current using the one or more catalyst layer stacks. The one or more fuel passages and the one or more air passages extend to combustion outlets and are positioned to combust at least some of the fuel and at least some of the air downstream of the one or more catalyst layer stacks.

In one embodiment, a method includes directing fuel into fuel inlets of fuel cells in a fuel cell stack that extends from an inlet end to a combustion outlet end. The fuel inlets are located proximate to the inlet end of the fuel cell stack. The method also includes directing air into air inlets of the fuel cells. The air inlets are located proximate to the inlet end of the fuel cell stack. The method also includes creating electric energy by directing the air and the fuel across opposite sides of a catalyst layer stack that includes an anode layer, an electrolyte layer, and a cathode layer, directing at least some of the fuel and at least some of the air through internal passages of the fuel cells toward combustion outlets of the fuel cells that are proximate to the combustion outlet end of the fuel cell stack, and combusting the at least some fuel and the at least some air proximate the combustion outlet ends as an output combustion from the fuel cells.

BRIEF DESCRIPTION OF THE DRAWINGS

The present inventive subject matter will be better understood from reading the following description of non-limiting embodiments, with reference to the attached drawings, wherein below.

DETAILED DESCRIPTION

Figure 1:
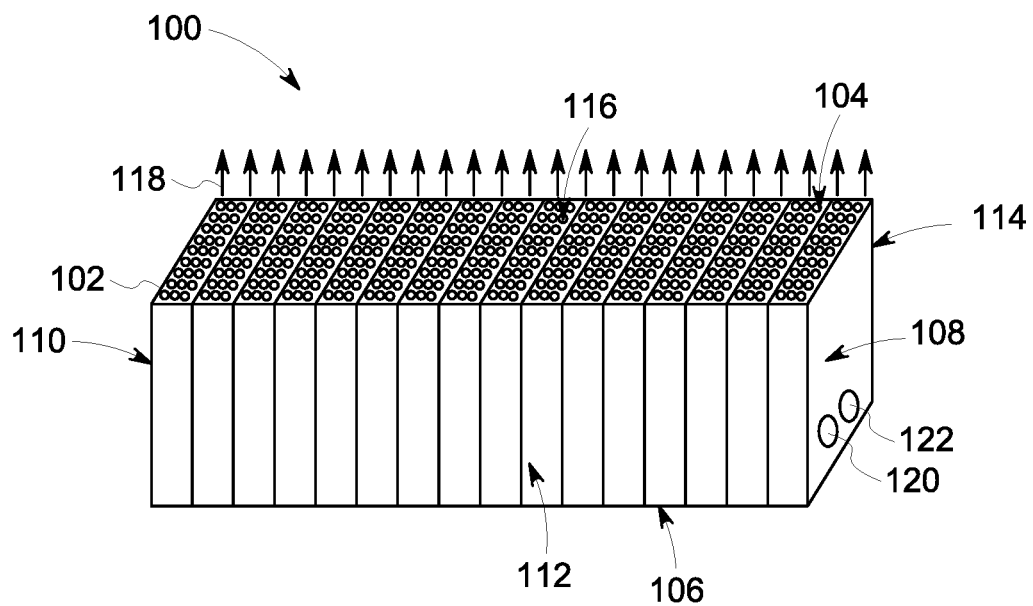
FIG. 1 illustrates one embodiment of an integrated fuel cell and combustion system.

The inventive subject matter described herein provides integrated fuel cell and combustion systems that combine fuel cells with a combustion system. The fuel cells can consume some fuel and air to generate electric current. The unused fuel (or fuel that is not consumed by the fuel cells) can be directed out of the fuel cells where the unused fuel is combusted. This combusted fuel can be used for other purposes or to perform other work, such as propelling an aircraft. The electric current generated by the fuel cells can be used to power one or more components of the aircraft.

The integrated fuel cell and combustion system may include metal-supported fuel cells arranged in a stack. Each of the fuel cells can have a metal support that provides conduction of electric current between the fuel cells in the same stack. This support can be referred to as a conductive support structure. The fuel cells can be solid oxide fuel cells (SOFC) or another type of fuel cell. The metal supports can include inner channels or can form these inner channels by placing multiple fuel cells side-by-side. These channels provide for the flow of air and fuel over electrodes of the fuel cells for the generation of electric current. The fuel cells can include porous supports at an interface between the electrodes and the metal support. The porous supports can be referred to as electrode supports.

The electrodes of the fuel cells can be deposited on this porous support, such as by depositing the anode on the porous support, an electrolyte on the anode, and a cathode on the electrolyte. The porous support may have pores that are large enough to allow fuel (e.g., gaseous fuel) flowing in the inner channels to diffuse through the porous support to the electrodes. But, the pores may be small enough to stop passage of particles forming the electrodes from passing through the porous support. In one embodiment, the pores in the porous support can range in size from two micrometers to eighty micrometers, but alternatively, may be smaller or larger depending on the size of the particles that are deposited to form the electrodes. The layers of material forming the electrodes can be deposited using thermal spraying or another deposition technique.

The conductive support structure and electrode support in a fuel cell can be formed from one or more corrosion resistant metals to slow degradation of the fuel cell (relative to using non-corrosion resistant metals). Examples of the metals that can be used include E-BRITE, stainless steel of the SS430 series (e.g., SS430, SS431, etc.), Jethete M152™, CROFER 22 APU, and HAYNES alloys, nickel and nickel chromium alloys, or the like. The metal may have a large chrome content (e.g., higher than ~8-10% by weight of the metal support or the porous support) to impart greater conductivity to the supports.

In one embodiment, thin protective coatings may be provided on the conductive support structure on the cathode or anode side of the fuel cell (e.g., a coating that is thinner than the cathode or anode) increase the conductivity of the oxide scale or prevent chromium evaporation and poisoning of the electrodes (e.g., the cathode). The protective coatings can be formed from materials such as cobalt, manganese, a combination of cobalt and manganese, electron-conducting ceramics, and the like.

The conductive support structure can provide inlet manifolds and gas flow fields for the electrodes of the fuel cell. Where other fuel cell systems collect the gases in exhaust manifolds and direct the gases to another fuel cell system component, the systems described herein direct the exhaust of the fuel cell flow fields into a combustion chamber and allowed to react (e.g., combust) just after leaving the fuel cell. The fuel cell includes a series of exhaust holes for fuel and air to allow for efficient combustion. The electrodes in each fuel cell can be terminated before the fuel and air exhaust locations (e.g., terminated along the direction in which the fuel and air flow in the fuel cell). For example, the electrodes may not come within one hundred micrometers to ten millimeters of the area where the fuel mixes with the air for combustion (e.g., the combustion chamber). This area where the electrodes do not extend into can be referred to as a termination region.

In the termination region, the composition of the conductive support structure may be varied relative to other regions of the conductive support structure to a more corrosion resistant alloy and/or can be coated with one or more thermal barrier coatings. These thermal barrier coatings can be formed from the same material as the electrolyte material of the fuel cell or may be an extension of the electrolyte coating or layer into the termination region (without the cathode and anode also extending into the termination region). This can help protect the termination region of the fuel cell stack from excessive corrosion.

The metal support can include elongated flow channels that separately direct the flow of air and fuel (e.g., gas) in one direction and cross-over ports that direct part of the air or fuel in a transverse direction. The metal supports of the fuel cells described herein can allow for fuel cells (such as SOFC) to be used to both generate electric current and generate combustion that may be used for propulsion. Other fuel cells may have ceramic components or supports, which can be too fragile to withstand combustions. Additionally, the metal supports of the fuel cells described herein may have coefficients of thermal expansion that are closer to the coefficients of thermal expansion of the materials used to create the electrodes and electrolytes that the heat generated (and conducted through the fuel cell) from the combustions does not create damaging levels of thermal stress. Moreover, the surfaces of the metal supports can be made rough by the porous supports to improve adhesion of the electrode layers to the metal supports.

Integrating fuel cells such as SOFC into a combustion system as a topping cycle operating at high pressure and low utilization can allow the fuel cells to produce high efficiency power at high power density (e.g., power densities greater than half a watt per square centimeter or power densities of at least three and up to ten watts per square centimeter). By integrating the fuel cells and fuel cell stacks directly into the combustion systems, many redundant heat exchangers and control systems for fuel and air management are integrated for an overall lower cost of power production. Additionally, for propulsion systems, the efficiency of the propulsion systems can be substantially increased by more than 100% due to the fuel cells producing electric power directly from the air and fuel that also is combusted to generate propulsion. For aircraft, this combination of electric current and propulsion can be used to increase flight ranges. For example, an aircraft can be at least partially propelled by thrust generated by the combustion from the fuel cells and the electric current generated by the fuel cells can be used to power an additional rim motor of the aircraft. For unmanned aircraft (e.g., drones), the integrated fuel cell and combustion system can provide an estimated double in fuel consumption efficiency, thereby increasing flight range by up to 40%. Optionally, the electric current that is generated can be used to power electronics onboard aircraft (e.g., other than those that generate thrust).

FIG. 1 illustrates one embodiment of an integrated fuel cell and combustion system 100. The system 100 includes an outer housing 102 having a combustion outlet side 104 and an opposite side 106, a fuel and air inlet side 108 and an opposite side 110, and opposite sides 112, 114. The sides 106, 114 are not visible in the perspective of FIG. 1. The shape of the outer housing 102 may differ from what is shown in FIG. 1. For example, the outer housing 102 need not have a rectangular or cubic shape in another embodiment.

The outlet side 104 includes several combustion outlets 116 from which combustion 118 is directed out of the housing 102. As described herein, the combustion 118 can be created using fuel and air that is not consumed by fuel cells in a fuel cell stack inside the housing 102. This combustion 118 can be used to generate propulsion or thrust for a vehicle, such as a manned or unmanned aircraft.

The inlet side 108 includes one or more fuel inlets 120 and one or more air inlets 122. Optionally, one or more of the inlets 120, 122 can be on another side of the outer housing 102. The fuel inlet 120 is fluidly coupled with a source of fuel for the fuel cells, such as one or more pressurized containers of a hydrogen-containing gas. Alternatively, another type or source of fuel may be used. The air inlet 122 is fluidly coupled with a source of air for the fuel cells, such as one or more pressurized containers of oxygen gas. Alternatively, another source of air may be provided. The inlets 120, 122 separately receive the fuel and air from the external sources of fuel and air, and separately direct the fuel and air into the fuel cells.

In one embodiment, the inlet side 108 and the outlet side 104 may be the only sides of the housing 102 that are not sealed. For example, the housing 102 may be sealed to prevent ingress or egress of fluids (gas and/or liquid) into and out of the housing 102 but for the fuel and air inlets 120, 122 and the combustion outlets 116. The air and fuel that is directed into the housing 102 via the inlets 120, 122 may be entirely or substantially consumed (e.g., at least 98% of the volume or mass is consumed) by the fuel cells inside the housing 102 and/or the generation of combustion 118. This can allow for the housing 102 to have no other outlet through which any fuel or air passes aside from the combustion outlets 116 through which the combustion 118 exits the housing 102.

In one embodiment, the system 100 can be formed from one hundred fuel cells stacked side-by-side from the end 108 to the end 110. Alternatively, the system 100 can include fewer or more fuel cells stacked side-by-side. The system 100 can be eight centimeters tall, 2.5 centimeters wide, and twenty-four centimeters long. Alternatively, the system 100 can be taller or shorter, wider or narrower, and/or longer or shorter than these example dimensions.

In one embodiment, a topping cycle fuel cell unit is provided. The fuel cell unit includes a support plate having internal flow passages that extend to combustion outlets, a first electrode layer coupled with the support plate, an electrolyte layer coupled with the first electrolyte layer such that the first electrode layer is between the support plate and the electrolyte layer, and a second electrode layer coupled with the electrolyte layer such that the electrolyte layer is between the first electrode layer and the second electrode layer. The second electrode layer is configured to be coupled to another support plate of another fuel cell unit. The internal flow passages are configured to receive and direct air across the first electrode layer or the second electrode layer and to receive and direct fuel across another of the first electrode layer or the second electrode layer such that the first electrode layer, the electrolyte layer, and the second electrode layer create electric current. The internal flow passages are configured to direct at least some of the air and at least some of the fuel to the combustion outlets where the at least some air and the at least some fuel is combusted.

The outlet end 206 of the fuel cell unit 202 may be located at or be coextensive with the outlet side 104 (shown in FIG. 1) of the housing 102. For example, the outlets 116 shown in FIG. 1 may be the outlet ends 206 of a stack of several fuel cell units 202. The inlet end 204 may be located at or inside the side 106 of the housing 102, the edge 208 may be at or inside the side 112 of the housing 102, and the opposite edge 210 may be at or inside the opposite side 114 of the housing 102.

Several fuel cell units 202 can be stacked or sandwiched together inside the housing 102. For example, several fuel cell units 202 can be placed into contact with each other so that the catalyst sides 200 of the fuel cell units 202 face the inlet side 108 of the housing 102. The catalyst side 200 represents the side of the fuel cell unit 202 that has several catalyst layers in an active region 216 of the fuel cell unit 202. These layers include an anode layer, a cathode layer, and an electrolyte layer (e.g., a solid oxide layer) disposed between the anode layer and the cathode layer.

The fuel cell unit 202 includes a fuel inlet 212 and an air inlet 214. The fuel inlet 212 can be aligned with or otherwise fluidly coupled with the fuel inlet 120 of the housing 102 and the air inlet 214 can be aligned with or otherwise fluidly coupled with the air inlet 122 of the housing 102. When the fuel cell units 202 are stacked against each other, the fuel inlets 212 can be aligned or otherwise fluidly coupled with the fuel inlet 120 so that the fuel cell units 202 receive fuel injected into the housing 102 via the fuel inlet 120. The air inlets 214 can be aligned or otherwise fluidly coupled with the air inlet 122 so that the fuel cell units 202 receive air injected into the housing 102 via the air inlet 122.

The support structure 300 can be relatively small in size. For example, the support structure 300 can have a length (e.g., the dimension running vertically, or up and down, in the perspective of FIG. 2) that is eight centimeters long. The support structure 300 can have a width (e.g., the dimension running horizontally, or left to right, in the perspective of FIG. 2) that is 2.5 centimeters long. The active region 216 can have a footprint, or extend over a surface area, that is ten square centimeters. Alternatively, the length and/or width of the support structure 300 and/or the size of the active region 216 can be smaller or larger than these dimensions.

Figure 2:
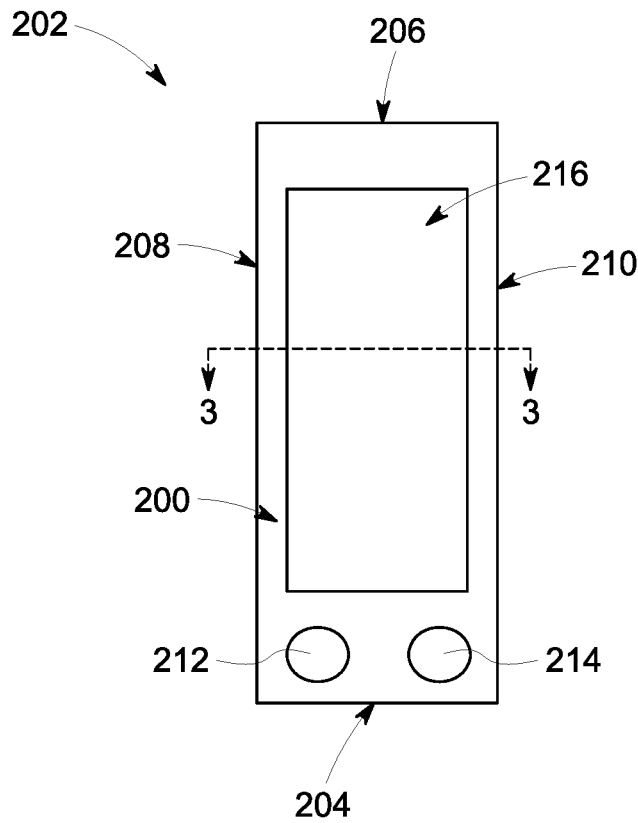
FIG. 2 illustrates a view of one embodiment of a catalyst side of a fuel cell unit in the integrated fuel cell and combustion system shown in FIG. 1.
Figure 3:
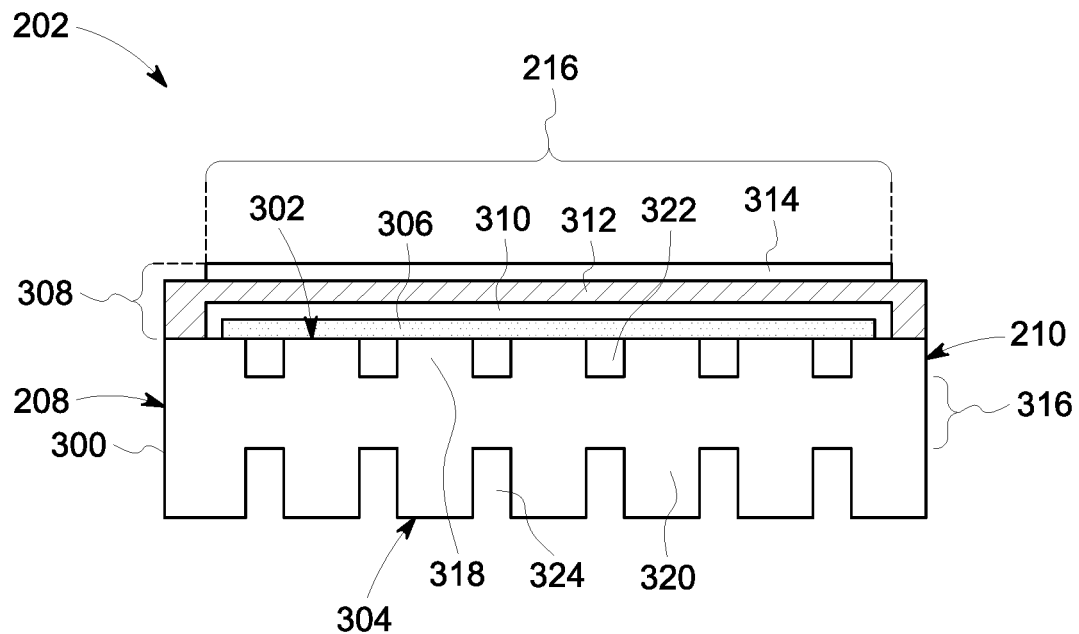
FIG. 3 illustrates a cross-sectional view of the fuel cell unit along line 3-3 shown in FIG. 2.

FIG. 3 illustrates a cross-sectional view of the fuel cell unit 202 along line 3-3 shown in FIG. 2. The fuel cell unit 202 includes a conductive support structure 300, such as a metal support. The support structure 300 optionally can be referred to as a plate. While the support structure 300 is shown as a planar plate, optionally, the support structure 300 can have a non-planar shape. For example, the support structure 300 can be formed as a curved plate around a center axis of an aircraft engine. Optionally, the support structure 300 can have another shape. While other components of the fuel cell unit 202 are shown as planar bodies or plates, optionally, these other components also can have a non-planar shape like the support structure 300.

The conductive support structure 300 can extend from the edge 208 to the edge 210, from the inlet end 204 to the outlet end 206 (shown in FIG. 2), and from a catalyst support surface 302 to an opposite open side or surface 304. A porous support layer 306 is provided on the catalyst support surface 302 of the conductive support structure 300. The porous support layer 306 can be formed from one or more materials that form pores to allow fuel and air to flow through the porous support layer 306. In one embodiment, the support structure 300 and the porous layer 306 can be formed from the same material or materials. The support structure 300 may be formed to be non-porous (e.g., fluids cannot pass through the support structure 300) while the porous layer 306 can be formed to include pores through which one or more fluids can pass through the layer 306. Examples of materials that can be used to create the support structure 300 and/or the porous support layer 306 include conducting ceramic materials (e.g., for the layer 306, foams made of ceramic-metal hybrid materials), metals, metal alloys, etc. The porous layer 306 can be formed by thermally spraying the material(s) used to form the layer 306 on the support structure 300, by forming a foam as the layer 306 on the structure 300 while brazing the structure 300 (and optionally adding a sintering aid to the foam), by additively manufacturing the layer 306 on the structure, by casting the layer 306 using a slurry, by heat treating the foam forming the layer 306 in an inert gas environment, etc.

In the illustrated embodiment, a catalyst layer stack 308 is provided on and separated from the conductive support structure 300 by the porous support layer 306. The catalyst layer stack 308 includes an anode layer 310 is deposited or otherwise formed on the porous support layer 306. The anode layer 310 is formed from materials that operate as an anode of the fuel cell formed by a combination of two of the fuel cell units 202. The catalyst layer stack 308 also includes an electrolyte layer 312 deposited or otherwise formed on the anode layer 310. The electrolyte layer 312 is formed from materials that operate as the electrolyte of the fuel cell formed by a combination of two of the fuel cell units 202. The catalyst layer stack 308 also includes a cathode layer 314 deposited or otherwise formed on the electrolyte layer 312. The cathode layer 314 is formed from materials that operate as the cathode of the fuel cell formed by a combination of two of the fuel cell units 202. Alternatively, the cathode layer 314 may be on and in contact with the porous layer 306 instead of the anode layer 310 with the anode layer 310 in the location of the cathode layer 314 shown in FIG. 3. The two-dimensional region or footprint of the layers 310, 312, 314 that overlap each other defines the active region 216 of the fuel cell unit 202.

In the cross-sectional plane of the illustrated embodiment, the conductive support structure 300 is formed as a combed body that includes a solid plate 316 with protrusions 318, 320 extending away from the solid plate 316 in opposite directions (e.g., toward the catalyst side 200 of the fuel cell unit 202 and toward the opposite open side 304 of the fuel cell unit 202. The protrusions 318, 320 can be elongated in directions extending into and out of the plane of FIG. 3, or toward the inlet and outlet ends 204, 206 (shown in FIG. 2) of the fuel cell unit 202. These protrusions and the plate 316 form elongated channels or passages 322, 324 that are internal to the support structure 300. For example, the passages 322, 324 extend into the interior of the body of the support structure 300. The passages 322, 324 are not shown to scale in FIG. 3. The passages 322, 324 can be less than one millimeter tall (e.g., the direction that the passages 322, 324 extend into the support structure 300), such as twenty-five mils tall. The passages 322, 324 can be around three millimeters wide, such as 3.176 millimeters wide. Alternatively, the passages 322 and/or 324 can be taller or shorter, wider or narrower.

In each fuel cell unit 202, the passages 322 on one side of the plate 316 can be fuel passages through which fuel flows through the fuel cell unit 202 and the passages 324 on the opposite side of the plate 316 can be air passages through which air flows through the fuel cell unit 202. Alternatively, if the cathode layer 314 is in contact with the porous layer 306 and the anode layer 310 is on the opposite side of the electrolyte layer 312, then the passages 322 may be the air passages and the passages 324 can be the fuel passages.

The passages 322 are each bounded or enclosed by the porous layer 306, two of the protrusions 318, and the plate 316. These passages 322 can be referred to as closed passages. In contrast, the passages 324 can be referred to as open passages as these passages 324 are bounded on three sides by the plate 316 and the protrusions 320 but are open along the open side 304 of the conductive support structure 300.

The fuel cell unit 202 may be relatively thin. For example, the support structure 300 may be around 2.2 millimeters thick (e.g., within 3% of 2.2 millimeters) and the catalyst layer stack 308 can be around two hundred microns thick (e.g., within 3% of two hundred microns). The cathode layer 314 can be fifty to one hundred microns thick, the electrolyte layer 312 can be five to thirty microns thick, and the anode layer 310 can be fifty to one hundred microns thick. Alternatively, one or more of these layers can be thicker or thinner than these example dimensions.

Figure 4:
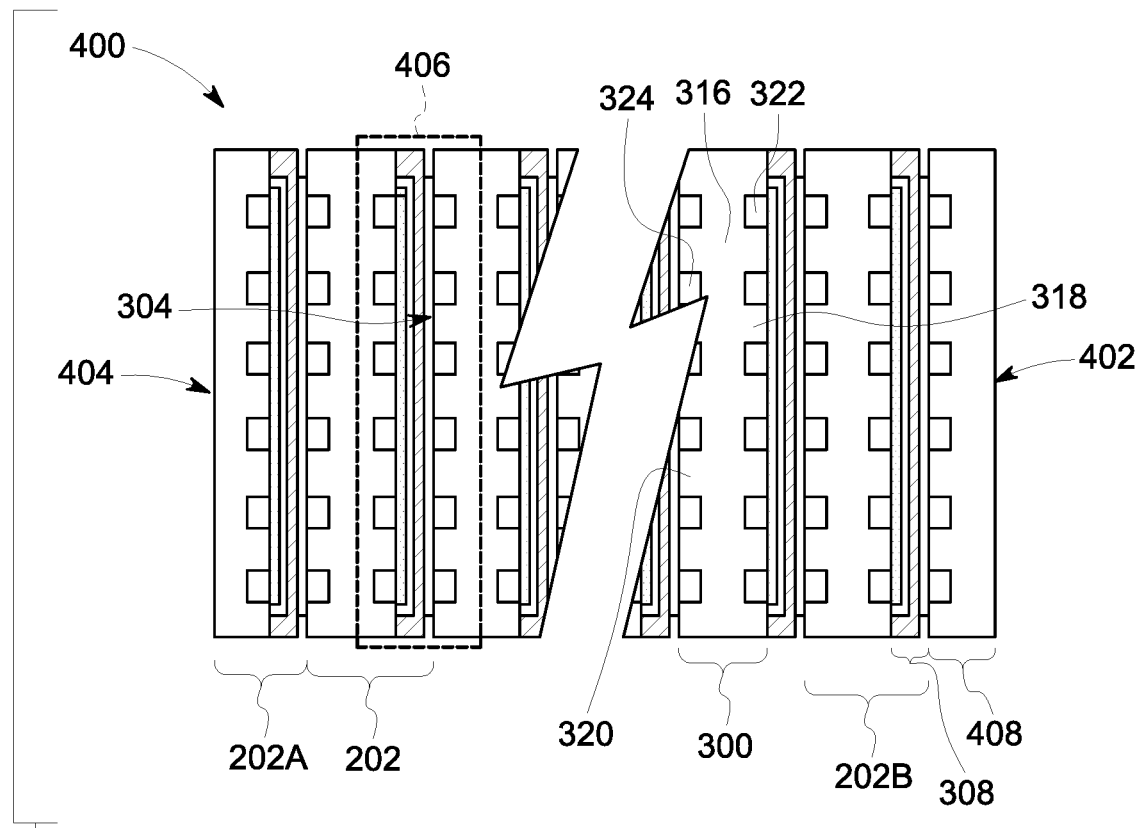
FIG. 4 illustrates one embodiment of a cross-sectional view of a stack of several fuel cell units shown in FIG. 2.

FIG. 4 illustrates one embodiment of a cross-sectional view of a stack 400 of several fuel cell units 202 shown in FIG. 2. The number of fuel cell units 202 in the stack 400 is provided as one example. A greater or lesser number of fuel cell units 202 may be included in the stack 400. The stack 400 is shown in cross-sectional view through a plane that is the same plane as shown in FIG. 3 for the individual fuel cell unit 202. The stack 400 extends from an inlet end 402 to an opposite end 404. The inlet end 402 may be at or inside the inlet side 108 of the housing 102 shown in FIG. 1. The opposite end 404 may be at or inside the opposite side 110 of the housing 102.

The fuel cell units 202 can be placed into contact with each other so that several of the fuel cell units 202 have the open side 304 of the conductive support structure 300 in contact with the catalyst layer stack 308 of another fuel cell unit 202. This can enclose the passages 324 between the plate 316 of one fuel cell unit 202, two protrusions 320 of the same fuel cell unit 202, and the catalyst layer stack 308 of another fuel cell unit 202, as shown in FIG. 4. This manner of stacking the fuel cell units 202 forms several fuel cells 406, with each of these fuel cells 406 formed from part, but not all, of two fuel cell units 202. An end fuel cell unit 202 (e.g., the fuel cell unit 202A in FIG. 4) may not have the protrusions 320 or passages 324 on one side of the plate 316 of that fuel cell unit 202A. Another end fuel cell unit 202 (e.g., the fuel cell unit 202B in FIG. 4) may be connected with an end cap support structure 408. The end cap support structure 408 may be part of a conductive support structure 300 that includes the plate 316 and protrusions 320 (and corresponding channels 324), but not the protrusions 318 (or corresponding channels 322).

Stacking the fuel cell units 202 against each other forms the several fuel cells 406, as shown in FIG. 4. The number of fuel cells 406 in each stack 400 can be increased by including more fuel cell units 202 in the stack 400. Within each fuel cell 406, fuel flows on one side of the catalyst layer stack 308 in the passages 322 of one fuel cell unit 202 while air flows on the other side of the same catalyst layer stack 308 in the passages 324 of another fuel cell unit 202. At least some of the fuel can pass through the porous support layer 306 to reach the anode layer 310 and the air can contact the cathode layer 314 so that the fuel cell 406 can generate electric current. Alternatively, air can flow on one side of the catalyst layer stack 308 in the passages 322 of one fuel cell unit 202 in a fuel cell 406 while fuel flows on the other side of the same catalyst layer stack 308 in the passages 324 of another fuel cell unit 202. At least some of the air can pass through the porous support layer 306 to reach the cathode layer that is on the porous support layer 306 and the fuel can contact the anode layer on the opposite side of the catalyst layer stack 308 so that the fuel cell 406 can generate electric current.

The fuel cells 404 can be connected in series with each other so that the electric current generated in the fuel cells 404 is additively combined. The current generated by each fuel cell 404 can be conducted through the conductive support structure 300 to a conductive body (e.g., a bus, wires, or the like) that is connected with several fuel cells 404. Alternatively, two or more of the fuel cells 404 may be connected in parallel with each other. This electric current can be conducted out of the stack 400 and out of the housing 102 shown in FIG. 1 by one or more conductive bodies, such as one or more buses, wires, cables, or the like.

Figure 5:
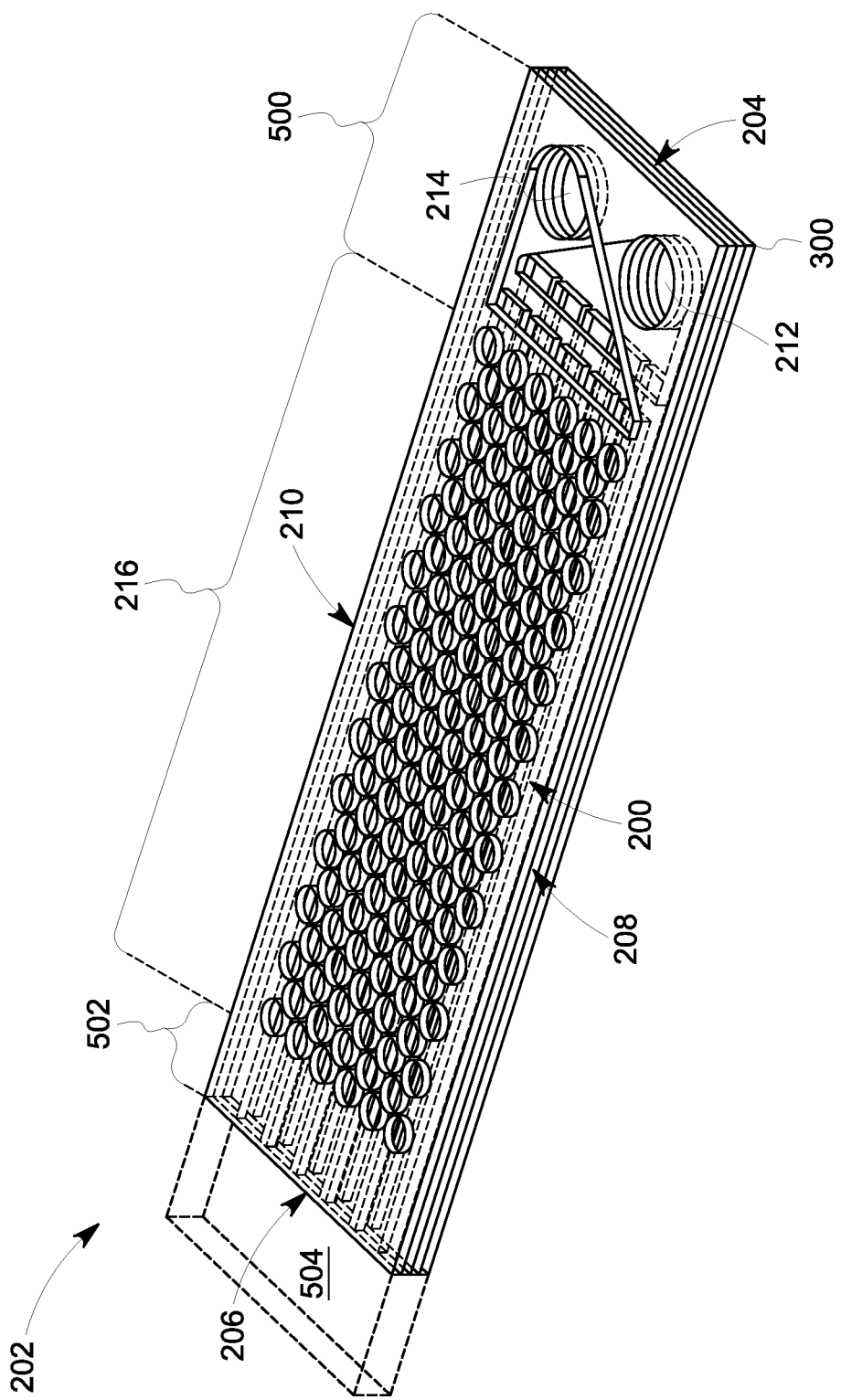
FIG. 5 illustrates a perspective view of one embodiment of a fuel cell unit shown in FIG. 2 without a catalyst layer stack shown in FIG. 3.

FIG. 5 illustrates a perspective view of one embodiment of a fuel cell unit 202 shown in FIG. 2 without the catalyst layer stack 308 shown in FIG. 3. The conductive support structure 300 of the fuel cell unit 202 can be formed from several layers, such as six layers, that are separately formed and then brazed together. Alternatively, the conductive support structure 300 can be formed from a single layer, from less than six layers, or from more than six layers. In another embodiment, the conductive support structure 300 can be formed from another technique, such as additive manufacturing.

The fuel cell unit 202 can be defined by several different regions. An inlet region 500 can include the portion of the fuel cell unit 202 that includes the fuel inlet 212 and the air inlet 214. The active region 216 represents the part of the fuel cell unit 202 where the catalyst layer stack 308 (shown in FIG. 3) can be provided to generate electric current. A termination region 502 can include the portion of the fuel cell unit 202 where the catalyst layer stack 308 does not extend over. Fuel and air that is not consumed by the catalyst layer stack 308 in generating electric current can flow through the termination region 502. The conductive support structure 300 can end at the combustion outlet end 206. The fuel and air that is not consumed by the catalyst layer stack 308 can flow out of the conductive support structure 300 and combust in a combustion region 504 that is beyond the outlet end 206. This creates the combustion 118 shown in FIG. 1. An ignition can be generated by an external device (e.g., an ignition system) at or near the outlet end 206 to spark combustion of the fuel and air.

With continued reference to the fuel cell unit 202 shown in FIG. 5, FIGS. 6 through 11 illustrate one embodiment of different layers 600, 700, 800, 900, 1000, 1100 of the conductive support structure 300 of the fuel cell unit 202 that is shown in FIG. 5. The layers 600, 700, 800, 900, 1000, 1100 can represent separate conductive plates or bodies that are separately formed and then coupled together to form the conductive support structure 300. Alternatively, the layers 600, 700, 800, 900, 1000, 1100 can represent different two-dimensional planes in a single, continuous body that forms the conductive support structure 300.

Figure 6:
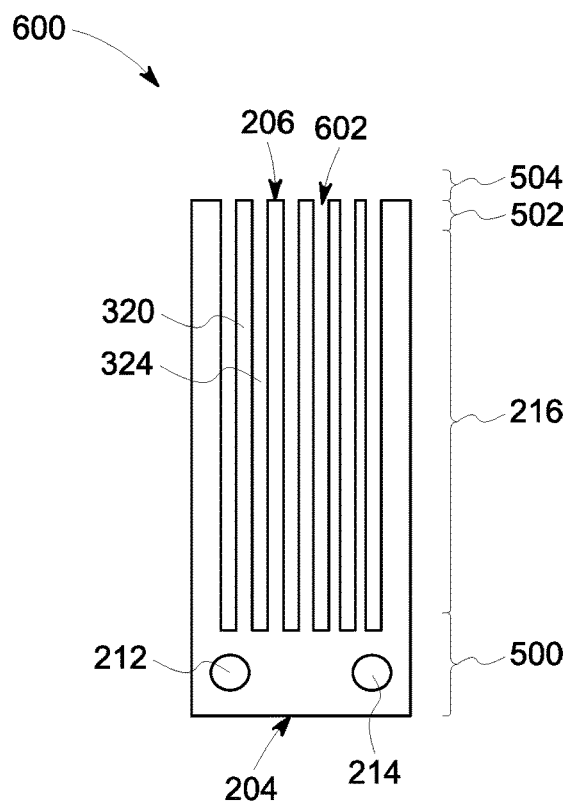
FIG. 6 illustrates one embodiment of a layer of or a plane extending through a conductive support structure of the fuel cell unit shown in FIG. 5.

The layer 600 shown in FIG. 6 may extend along and define the open side 304 of the conductive support structure 300. The layer 600 includes the protrusions 320 in the active region 216 and the termination region 502 to define the passages 324 described above. The protrusions 320 are elongated in the first direction (that extends from the inlet side 204 to the outlet side 206 of the fuel cell unit 202) in the active and termination regions 216, 502. As shown, the passages 324 defined by the elongated protrusions 320 are open at the outlet side 206 of the fuel cell unit 202 (thereby forming outlet openings 602). This allows for the fuel (or air) flowing through the passages 324 to exit from the termination region 502 and into the combustion region 504, where the fuel (or air) flowing in the passages 324 (and not consumed by the catalyst layer stack 308) is combusted. The passages 324 are open on both the visible side of the layer 600 and the opposite side of the layer 600 that is not visible in FIG. 6. This allows for the fuel (or air) flowing in the passages 324 to flow to the catalyst layer stack 308 in an adjacent fuel cell unit 202.

The fuel inlet 212 and the air inlet 214 can extend through the layer 600 in the inlet region 500 to one or more other fuel cell units 202 so that the other fuel cell units 202 in the stack 400 can receive fuel and air from the fuel inlet 120 and the air inlet 122 of the housing 102 shown in FIG. 1.

Figure 7:
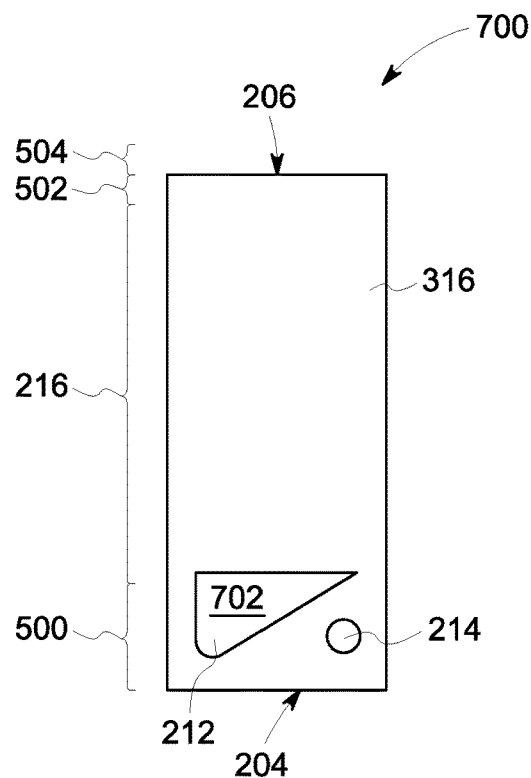
FIG. 7 illustrates one embodiment of an adjacent layer or plane to the layer or plane shown in FIG. 6.

The layer 700 shown in FIG. 7 may be adjacent to the layer 600 (e.g., be in contact with the layer 600 with no intervening layer between the layers 600, 700). The layer 700 forms at least part of the plate 316 that separates the passages 322, 324 in the fuel cell 202 from each other. As shown, the portion of the plate 316 in the layer 700 can be a solid, continuous body in the active and termination regions 216, 502 such that no air or fuel passes in these regions 216, 502 in the layer 700. The layer 700 includes an expander volume 702 that is fluidly coupled with one of the inlets, such as the fuel inlet 212. The expander volume 702 is not fluidly coupled with the other inlet, e.g., the air inlet 214, in the layer 700. The expander volume 702 increases the space over which the fuel received from the inlet 212 flows in the conductive support structure 300 in the inlet region 500. The expander volume 702 is an open space that widens from the size of the fuel inlet 212 to a width that is greater than the space over which the passages 324 extend, as shown in FIGS. 6 and 7. The expander volume 702 is fluidly coupled with the passages 324 in the layer 600 so that the fuel received via the inlet 212 expands in the expander volume 702 of the layer 700 and flows into and along the passages 324 in the layer 600. The triangular shape of the expander volume 702 is one example of the shape of the expander volume 702. The expander volume 702 may have another shape, such as a rectangular conduit that is elongated in the third direction described above.

Figure 8:
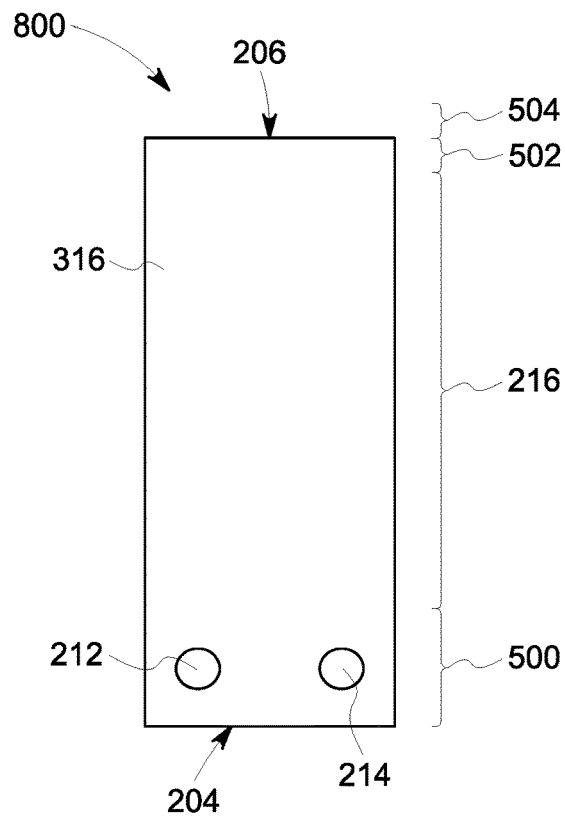
FIG. 8 illustrates one embodiment of an adjacent layer or plane to the layer or plane shown in FIG. 7.

The layer 800 shown in FIG. 8 may be adjacent to the layer 700 (e.g., be in contact with the layer 700 with no intervening layer between the layers 700, 800) with the layer 700 between the layer 600 and the layer 800, and the layer 700 extending from the layer 600 to the layer 800. The layer 800 forms at least part of the plate 316 that separates the passages 322, 324 in the fuel cell 202 from each other. As shown, the portion of the plate 316 in the layer 800 can be a solid, continuous body in the active and termination regions 216, 502 such that no air or fuel passes in these regions 216, 502 in the layer 800. The fuel inlet 212 and the air inlet 214 can extend through the layer 800 in the inlet region 500 to one or more other fuel cell units 202 so that the other fuel cell units 202 in the stack 400 can receive fuel and air from the fuel inlet 120 and the air inlet 122 of the housing 102 shown in FIG. 1.

Figure 9:
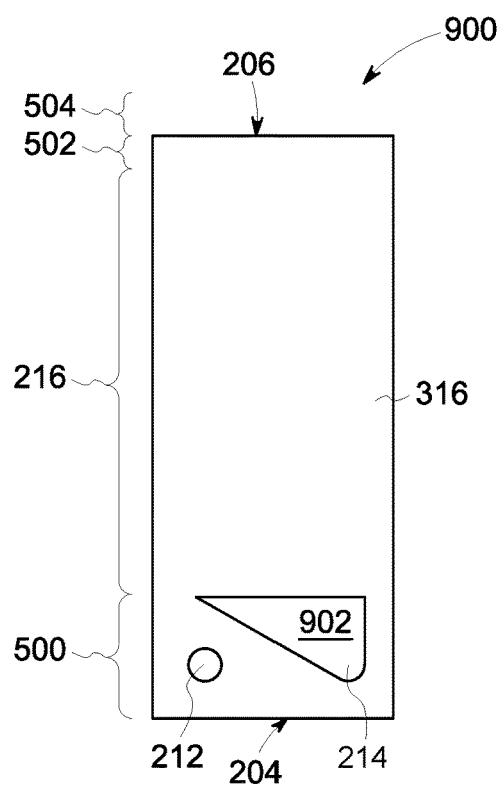
FIG. 9 illustrates one embodiment of an adjacent layer or plane to the layer or plane shown in FIG. 8.
Figure 10:
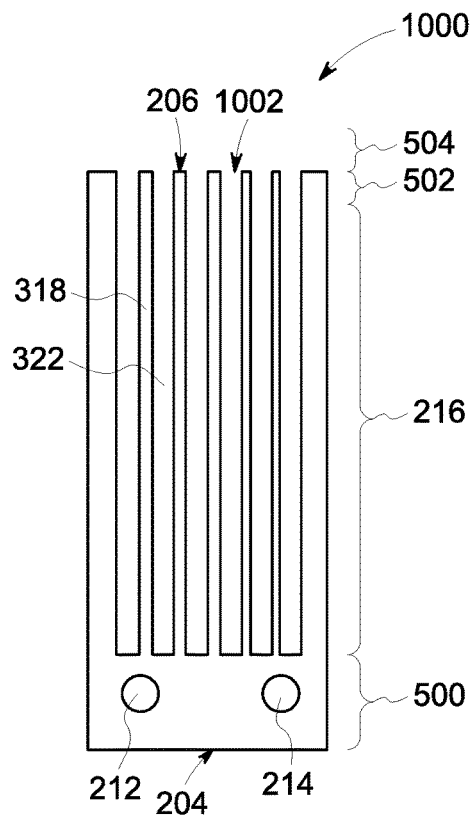
FIG. 10 illustrates one embodiment of an adjacent layer or plane to the layer or plane shown in FIG. 9.

The layer 900 shown in FIG. 9 may be adjacent to the layer 800 (e.g., be in contact with the layer 800 with no intervening layer between the layers 800, 900) with the layer 800 between the layer 700 and the layer 900, and the layer 800 extending from the layer 700 to the layer 900. The layer 900 forms at least part of the plate 316 that separates the passages 322, 324 in the fuel cell 202 from each other. As shown, the portion of the plate 316 in the layer 900 can be a solid, continuous body in the active and termination regions 216, 502 such that no air or fuel passes in these regions 216, 502 in the layer 900. The layer 900 includes another expander volume 902 that is fluidly coupled with one of the inlets, such as the air inlet 214. The expander volume 902 is not fluidly coupled with the other inlet, e.g., the fuel inlet 212, in the layer 900. The expander volume 902 increases the space over which the air received from the inlet 214 flows in the conductive support structure 300 in the inlet region 500. The expander volume 902 is an open space that widens from the size of the air inlet 214 to a width that is greater than the space over which the passages 322 extend, as shown in FIGS. 9 and 10. The expander volume 902 is fluidly coupled with the passages 322 in the layer 1000 so that the air received via the inlet 214 expands in the expander volume 902 of the layer 900 and flows into and along the passages 322 in the layer 1000. The triangular shape of the expander volume 902 is one example of the shape of the expander volume 902. The expander volume 902 may have another shape, such as a rectangular conduit that is elongated in the third direction described above.

The layer 1000 shown in FIG. 10 may be adjacent to the layer 900 (e.g., be in contact with the layer 900 with no intervening layer between the layers 900, 1000) with the layer 900 between the layer 800 and the layer 1000, and the layer 900 extending from the layer 800 to the layer 1000. The layer 1000 includes the protrusions 318 in the active region 216 and the termination region 502 to define the passages 322 described above. The protrusions 318 are elongated in the first direction (that extends from the inlet side 204 to the outlet side 206 of the fuel cell unit 202) in the active and termination regions 216, 502. The passages 322 are fluidly coupled with the expander volume 902 in the layer 900 shown in FIG. 9 in that the expander volume 902 is wider than the passages 322 and the layers 900, 1000 are adjacent to each other.

As shown, the passages 322 defined by the elongated protrusions 318 are open at the outlet side 206 of the fuel cell unit 202 (thereby forming outlet openings 1002). This allows for the air (or fuel) flowing through the passages 322 to exit from the termination region 502 and into the combustion region 504, where the air (or fuel) flowing in the passages 322 (and not consumed by the catalyst layer stack 308) is combusted.

The fuel inlet 212 and the air inlet 214 can extend through the layer 1000 in the inlet region 500 to one or more other fuel cell units 202 so that the other fuel cell units 202 in the stack 400 can receive fuel and air from the fuel inlet 120 and the air inlet 122 of the housing 102 shown in FIG. 1.

Figure 11:
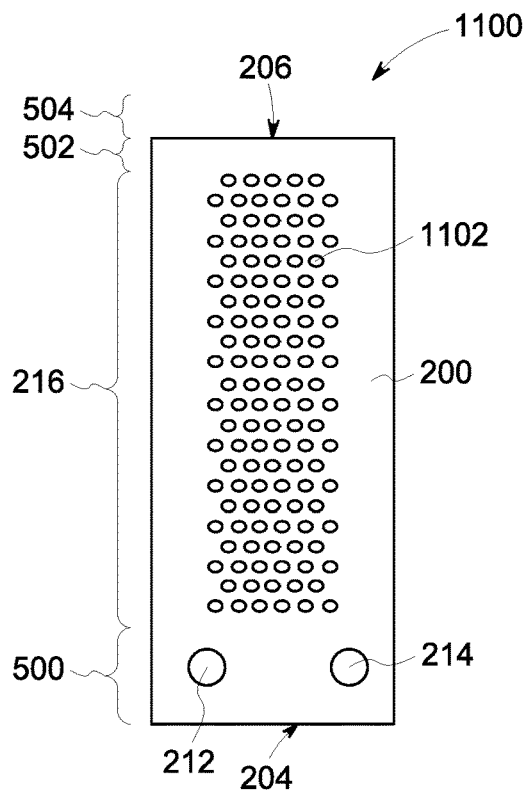
FIG. 11 illustrates one embodiment of an adjacent layer or plane to the layer or plane shown in FIG. 10.

The layer 1100 shown in FIG. 11 may be adjacent to the layer 1000 (e.g., be in contact with the layer 1000 with no intervening layer between the layers 1000, 1100) with the layer 1000 between the layer 900 and the layer 1100, and the layer 1000 extending from the layer 900 to the layer 1100. The layer 1100 includes cross-over ports 1102 that provide open channels or conduits transversely extending through the layer 1100 along the second direction described above. These ports 1102 are fluidly coupled with the passages 322 in the layer 1000 and with the porous support 306 in the catalyst layer stack 308 shown in FIG. 3. The ports 1102 are not visible in FIG. 3 because the ports 1102 are aligned with the passages 322. Some of the air (or fuel) flowing in the passages 322 exits from the passages 322, flows through the cross-over ports 1102 to the porous support 306, and flows through the porous support 306 to the catalyst layers 310, 312, 314 (e.g., to the anode 310), as described above.

Optionally, the conductive support structure 300 can be a more condensed body formed of fewer layers and/or being thinner than a support structure 300 formed from the layers 600 through 1100. For example, the support structure 300 can be formed from the layer 600 along the open side 304 of the support structure 300, the layer 700 adjacent to the layer 600, the layer 1000 adjacent to the layer 700 (with the layer 700 between the layers 600, 1000 and with the layer 700 extending from the layer 600 to the layer 1000 with no intervening other layers between the layers 600, 1000), and a modified version of the layer 1100 on the layer 1000 (with the layer 1000 between the layer 700 and the modified layer and with the layer 1000 extending from the layer 700 to the modified layer with no intervening other layers therebetween). This modified version of the layer 1100 is shown in FIG. 12.

Figure 12:
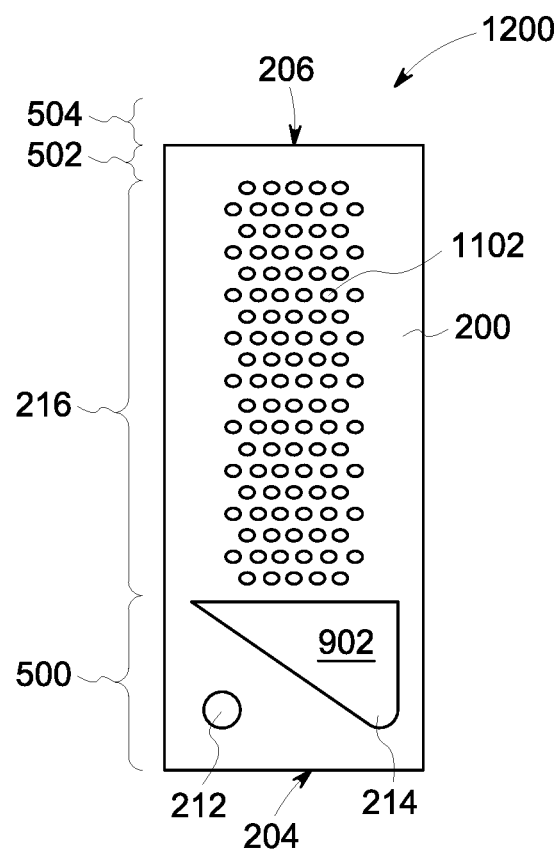
FIG. 12 illustrates an alternative embodiment of the layer or plane shown in FIG. 11.

FIG. 12 illustrates the modified layer 1200 according to another embodiment of the conductive support structure 300. The modified layer 1200 is a combination of the layers 900, 1100 in that the modified layer 1200 includes both the expander volume 902 and the cross-over ports 1102. The expander volume 902 and the cross-over ports 1102 are fluidly coupled with the passages 322 in the layer 1000, as described above.

Figure 13:
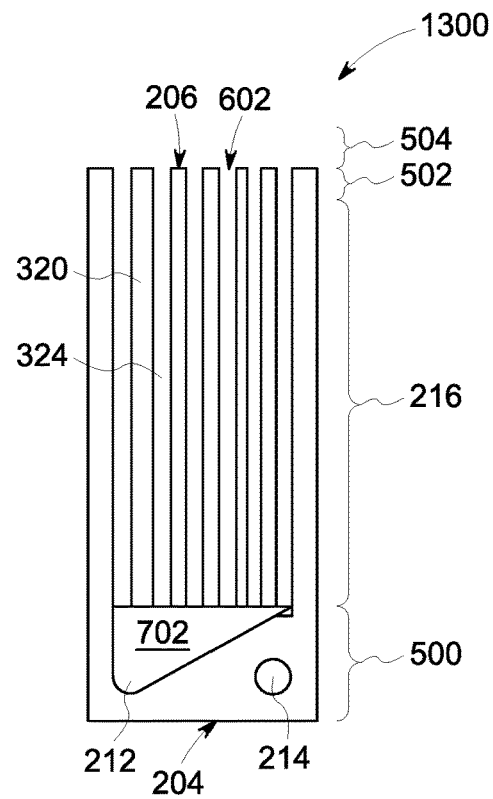
FIG. 13 illustrates an alternative embodiment of the layer or plane shown in FIG. 6.
Figure 14:
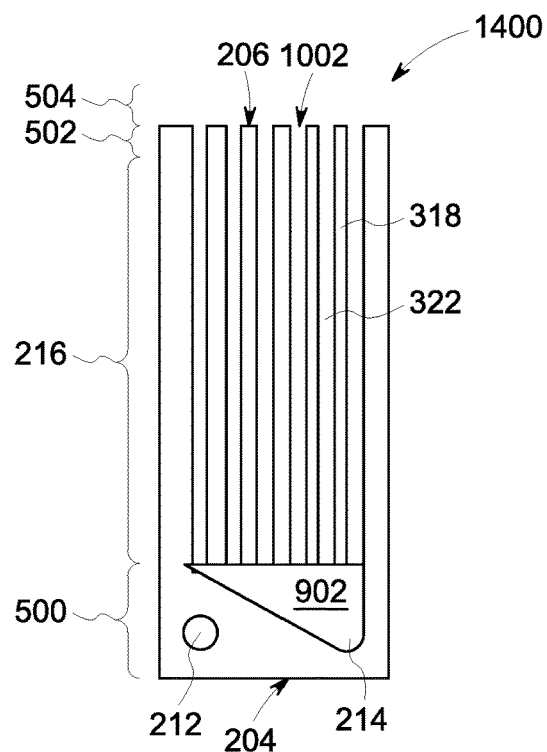
FIG. 14 illustrates an alternative embodiment of the layer or plane shown in FIG. 10.

Alternatively, the conductive support structure 300 can be formed from a combination of a modified version of the layer 600, the layer 800, a modified version of the layer 1000, and the layer 1100. FIG. 13 illustrates a layer 1300 as the modified version of the layer 600 and FIG. 14 illustrates a layer 1400 as the modified version of the layer 1000. The layer 1300 can be positioned in the support structure 300 to form the open side 304 of the structure 300 and the passages 324 of the structure 300. The layer 800 can be placed onto the layer 1300 to form the plate 316 described above. The layer 1400 can be placed onto the layer 800 to form the passages 324 of the structure 300. The layer 1100 can be placed onto the layer 1400 to fluidly couple the passages 324 with the porous structure 306 and the catalyst layer stack 308, as described above. As shown, the layer 1300 can include the expander volume 702 to fluidly couple the fuel inlet 212 with the passages 324 and the layer 1400 can include the expander volume 902 to fluidly couple the air inlet 214 with the passages 322.

The passages 322, 324 are shown as being linear, elongated channels in the illustrated examples. Alternatively, one or more of the passages 322, 324 may be curved and/or may include one or more turns (e.g., one or more ninety-degrees turns).

Figure 15:
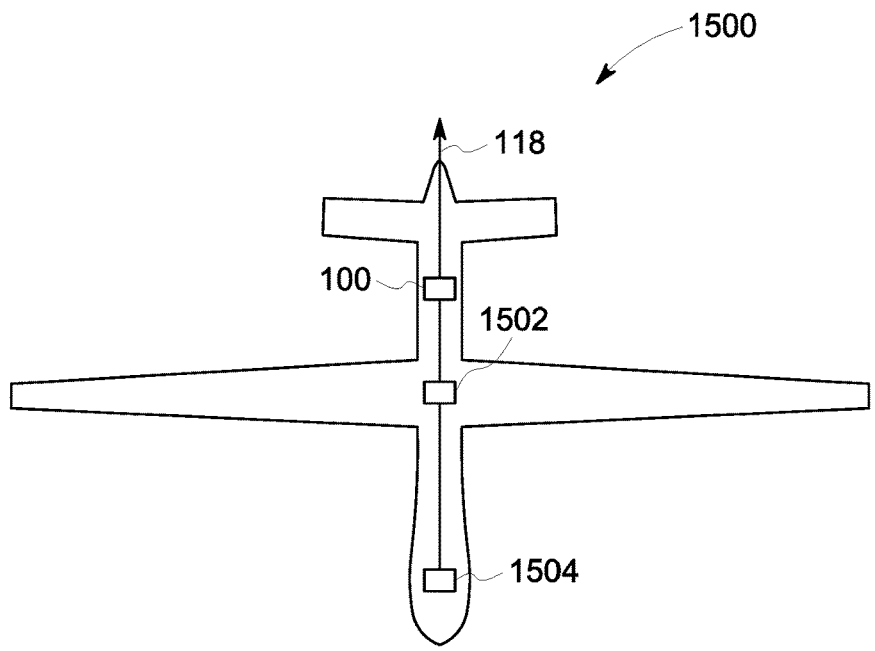
FIG. 15 illustrates one embodiment of a vehicle system that can be at least partially powered and/or propelled by one or more of the integrated fuel cell and combustion systems shown in FIG. 1.

FIG. 15 illustrates one embodiment of a vehicle system 1500 that can be at least partially powered and/or propelled by one or more of the integrated fuel cell and combustion systems 100 shown in FIG. 1. The vehicle system 1500 optionally can be referred to as a vehicle. The vehicle system 1500 is shown as an aircraft (e.g., an unmanned aerial vehicle), but optionally may be a manned aircraft, a marine vessel, or a ground-based vehicle (e.g., an automobile, rail vehicle, mining vehicle, or the like). The vehicle system 1500 includes one or more of the integrated fuel cell and combustion systems 100 that generate combustion 118 to propel or assist in propelling the vehicle system 1500. For example, the combustion 118 can provide thrust to the vehicle system 1500 to assist in moving the vehicle system 1500.

The vehicle system 1500 can include one or more powered systems 1502, 1504 that receive electric current generated by the integrated fuel cell and combustion system 100 to perform work. For example, the powered systems 1502, 1504 may be loads that are at least partially powered by the current generated by the fuel cells 406 in the integrated fuel cell and combustion system 100. Examples of the powered systems 1502, 1504 may be control circuitry that controls movement, thrust, throttle settings, movement directions, etc., of the vehicle system 1500, weapons of the vehicle system 1500, navigation systems, motors (e.g., rim motors), or the like. The powered systems 1502, 1504 can be conductively coupled with the system(s) 100 to receive the electric current from the fuel cells 406.

Figure 16:
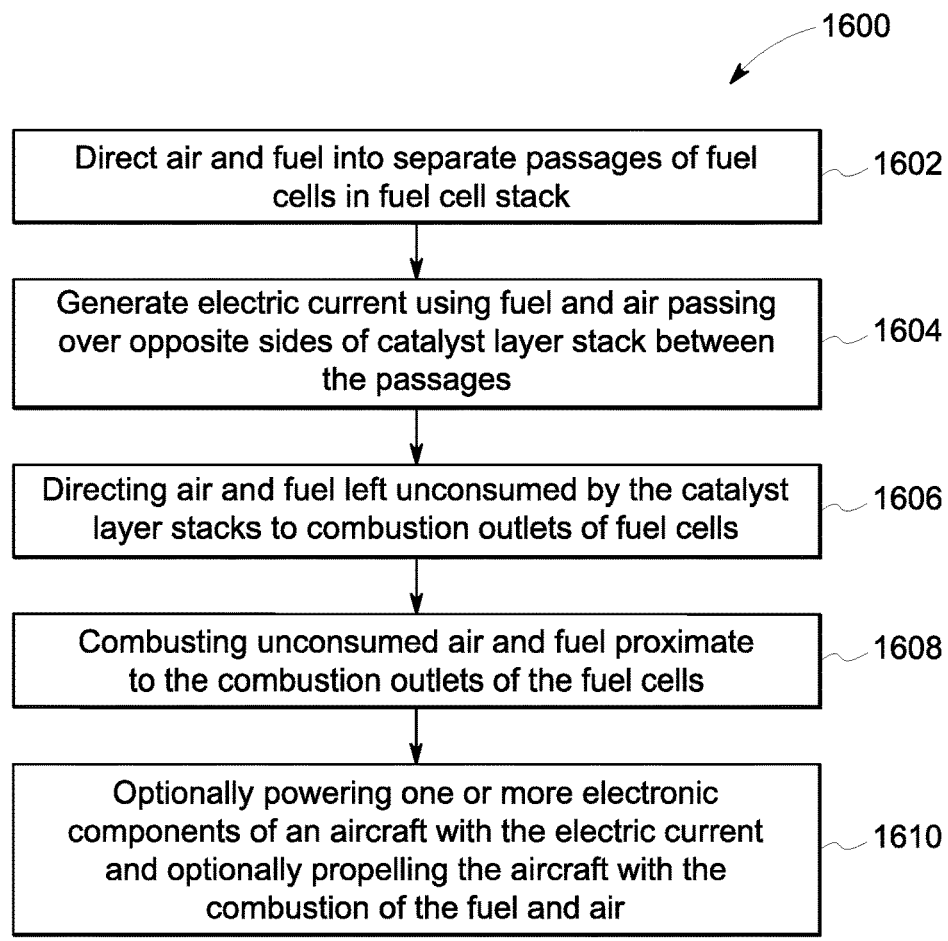
FIG. 16 illustrates a flowchart of one embodiment of a method for generating both electric energy and combustion from a fuel cell stack.

FIG. 16 illustrates a flowchart of one embodiment of a method 1600 for generating both electric energy and combustion from a fuel cell stack. The method 1600 can describe operation of one or more embodiments of the integrated fuel cell and combustion systems 100 described herein. The operations described in connection with the method 1600 can be automatically controlled by one or more processors, pumps, valves, motors, or the like, to automatically control the concurrent or simultaneous generation of electric current and combustion for propulsion by the fuel cells in the system 100.

At 1602, air and fuel are directed into separate passages of fuel cells in the fuel cell stack of the system. For example, oxygen can be directed into the air inlet of the outer housing of the system and gas can be directed into the fuel inlet of the outer housing of the system. These inlets are separately connected with air passages and fuel passages in different fuel cells.

At 1604, electric current is generated using at least some of the fuel and the air passing over or otherwise contacting the catalyst layer stacks in the fuel cells. For example, the fuel passages may extend over one side of the catalyst layer stacks in each fuel cell and the air passages may extend over the opposite sides of the catalyst layer stacks in the same fuel cells. The fuel and air contact the cathode and anode layers, respectively, in the catalyst layer stack of each fuel cell to generate electric current. This current can be conducted through the conductive support structures of the fuel cells to one or more external loads.

At 1606, the air and fuel that is not consumed during the generation of electric current continues to flow through the elongated fuel and air passages. This air and fuel may remain separate in the fuel cells while the air and fuel flow toward the open ends of the air and fuel passages in the fuel cells.

At 1608, the air and fuel that is unconsumed during generation of the electric current and that flows to the open ends of the passages of the fuel cells are combusted. This combustion can occur just outside of the open ends of the passages, outside of the fuel cells. At 1610, optionally, the electric current generated by the fuel cells is used to power one or more loads, such as one or more electronic components of an aircraft. The combustion that is generated by the fuel cells can be used to propel the aircraft or assist in propelling the aircraft.

Although various dimensions are provided herein for the system 100 and fuel cell units 202, these dimensions can be varied as needed. For example, the dimensions of the components can be changed to increase combustion and/or electric current generation, can be changed to accommodate for continuing even flow of air and fuel in situations where an aircraft engine is decreasing or increasing thrust, or the like.

In one embodiment, a topping cycle fuel cell unit is provided. The fuel cell unit includes a support plate having internal flow passages that extend to combustion outlets, a first electrode layer coupled with the support plate, an electrolyte layer coupled with the first electrolyte such that the first electrode layer is between the support plate and the electrolyte layer, and a second electrode layer coupled with the electrolyte layer such that the electrolyte layer is between the first electrode layer and the second electrode layer. The second electrode layer is configured to be coupled to another support plate of another fuel cell unit. The internal flow passages are configured to receive and direct air across the first electrolyte layer or the second electrolyte layer and to receive and direct fuel across another of the first electrolyte layer or the second electrolyte layer such that the first electrode layer, the electrolyte layer, and the second electrode layer create electric current. The internal flow passages are configured to direct at least some of the air and at least some of the fuel to the combustion outlets where the at least some air and the at least some fuel is combusted.

Optionally, the first electrode layer is an anode layer and the second electrode layer can be a cathode layer. Alternatively, the first electrode layer can be a cathode layer and the second electrode layer can be an anode layer.

The support plate can be a planar plate. Alternatively, the support plate can be a non-planar plate. Optionally, the support plate is conductive.

The support plate, the first electrode layer, the electrolyte layer, and the second electrode layer can be shaped to be positioned onboard an aircraft with the support plate conductively coupled to one or more electronic loads of the aircraft such that at least some of the electric current created by the first electrode layer, the electrolyte layer, and the second electrode layer powers the one or more electronic loads, and wherein the combustion outlets of the internal passages of the support plate are oriented on the aircraft to propel the aircraft.

Optionally, first support structure includes a plate disposed between different groups of the passages.

A first group of the passages that direct flow of the air can be located on one side of the plate and a different, second group of the passages that direct flow of the fuel can be located on an opposite side of the plate.

The fuel cell unit optionally can include a porous layer disposed between the support plate and the first electrode layer.

In one embodiment, an integrated fuel cell and combustion system is provided. The system includes plural fuel cells each having conductive support structures that include first and second plates defining one or more fuel passages and one or more air passages. Each of the one or more fuel passages is fluidly coupled with a fuel inlet and each of the one or more air passages fluidly coupled with an air inlet. The system also includes one or more catalyst layer stacks disposed between the first plate of the support structure and the one or more fuel passages and disposed between the second plate of the support structure and the one or more air passages. The one or more fuel passages are positioned to direct a flow of fuel on each of the one or more catalyst layer stacks. The one or more air passages are positioned to direct a flow of air on an opposite side of each of the one or more catalyst layer stacks to generate electric current using the one or more catalyst layer stacks. The one or more fuel passages and the one or more air passages extend to combustion outlets and are positioned to combust at least some of the fuel and at least some of the air downstream of the one or more catalyst layer stacks.

Optionally, the first plate of at least one of the support structures includes protrusions extending from opposite fuel and air sides of the first plate. The fuel passages can be located on the fuel side of the first plate between the protrusions on the fuel side of the first plate. The air passages can be located on the air side of the first plate between the protrusions on the air side of the first plate.

The system also can include one or more porous support layers disposed between the one or more fuel passages the first plate of the support structures and at least one of the catalyst layer stacks. The porous support layer can include pores through which at least some of the fuel from the one or more fuel passages flows through at least one of the porous support layers to the at least one catalyst layer stack.

Optionally, the one or more catalyst layer stacks include a cathode layer coupled with the one or more porous support layers, an electrolyte layer coupled with the cathode layer so that the cathode layer is positioned between the porous support layer and the electrolyte layer, and an anode layer coupled with the electrolyte layer so that the electrolyte layer is between the cathode layer and the anode layer.

The support structures of the fuel cells can be conductively coupled with each other. The support structures can be configured to be conductively coupled with one or more systems of a vehicle to power the one or more systems using at least some of the electric current created by the one or more catalyst layer stacks.

Optionally, the fuel cells and the one or more catalyst layer stacks are onboard an aircraft and configured to both generate propulsion for the aircraft using combustion of the at least some fuel and the at least some air and generate the electric current to power one or more loads of the aircraft.

In one embodiment, a method includes directing fuel into fuel inlets of fuel cells in a fuel cell stack that extends from an inlet end to a combustion outlet end. The fuel inlets are located proximate to the inlet end of the fuel cell stack. The method also includes directing air into air inlets of the fuel cells. The air inlets are located proximate to the inlet end of the fuel cell stack. The method also includes creating electric energy by directing the air and the fuel across opposite sides of a catalyst layer stack that includes an anode layer, an electrolyte layer, and a cathode layer, directing at least some of the fuel and at least some of the air through internal passages of the fuel cells toward combustion outlets of the fuel cells that are proximate to the combustion outlet end of the fuel cell stack, and combusting the at least some fuel and the at least some air proximate the combustion outlet ends as an output combustion from the fuel cells.

Optionally, the method also includes one or more of propelling a vehicle using the output combustion and/or supplying the electric energy to one or more systems of the vehicle to power the one or more systems.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the subject matter set forth herein and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A topping cycle fuel cell unit, the fuel cell unit comprising:
    a support plate comprising an inlet region, an active region downstream of the inlet region, and a termination region downstream of the active region, the support plate having internal flow passages that extend from the inlet region through the active region and the termination region; and
    a combustion region downstream of the termination region,
    wherein the active region comprises:
        a first electrode layer coupled with the support plate;
        an electrolyte layer coupled with the first electrode layer such that the first electrode layer is between the support plate and the electrolyte layer; and
        a second electrode layer coupled with the electrolyte layer such that the electrolyte layer is between the first electrode layer and the second electrode layer, wherein the second electrode layer is configured to be coupled to another support plate of another fuel cell unit,
    wherein the internal flow passages are configured to receive and direct air input to the inlet region across the first electrode layer or the second electrode layer, and to receive and direct fuel input to the inlet region across the other of the first electrode layer or the second electrode layer such that the first electrode layer, the electrolyte layer, and the second electrode layer create electric current, and
    wherein the internal flow passages are further configured to direct at least some of the air and at least some of the fuel from the active region through the termination region to the combustion region, where the at least some air and the at least some fuel is combusted and output via combustion outlets in the combustion region to generate propulsive force by the combustion outlets.

2. The fuel cell unit of claim 1, wherein the first electrode layer is an anode layer and the second electrode layer is a cathode layer, and
    the internal flow passages are configured to receive and direct fuel across the first electrode layer and to receive and direct air across the second electrode layer.

3. The fuel cell unit of claim 1, wherein the first electrode layer is a cathode layer and the second electrode layer is an anode layer, and
    the internal flow passages are configured to receive and direct air across the first electrode layer and to receive and direct fuel across the second electrode layer.

4. The fuel cell unit of claim 1, wherein the support plate is a planar plate.

5. The fuel cell unit of claim 1, wherein the support plate is a non-planar plate.

6. The fuel cell unit of claim 1, wherein the support plate is conductive.

7. The fuel cell unit of claim 1, wherein the support plate, the first electrode layer, the electrolyte layer, and the second electrode layer are shaped to be positioned onboard an aircraft with the support plate conductively coupled to one or more electronic loads of the aircraft such that at least some of the electric current created by the first electrode layer, the electrolyte layer, and the second electrode layer powers the one or more electronic loads, and wherein the combustion outlets are oriented on the aircraft to propel the aircraft.

8. The fuel cell unit of claim 1, wherein the first support plate includes a structure disposed between different groups of the passages.

9. The fuel cell unit of claim 8, wherein a first group of the passages that direct flow of the air is located on one side of the support plate and a different, second group of the passages that direct flow of the fuel is located on a side of support plate opposite the one side of the support plate.

10. The fuel cell unit of claim 1, further comprising a porous layer disposed between the support plate and the first electrode layer.

* * * * *